US010553054B1

(12) United States Patent
Wendling

(10) Patent No.: US 10,553,054 B1
(45) Date of Patent: Feb. 4, 2020

(54) ELECTRONIC CREDENTIAL READER WITH FACILITY CODE FILTERING

(71) Applicant: Hugo Wendling, Denver, CO (US)

(72) Inventor: Hugo Wendling, Denver, CO (US)

( * ) Notice: Subject to any disclaimer, the term of this patent is extended or adjusted under 35 U.S.C. 154(b) by 0 days.

(21) Appl. No.: 16/128,924

(22) Filed: Sep. 12, 2018

(51) Int. Cl.
*H04W 4/80* (2018.01)
*G07C 9/00* (2006.01)

(52) U.S. Cl.
CPC .................... *G07C 9/00182* (2013.01); *G07C 2009/00769* (2013.01)

(58) Field of Classification Search
None
See application file for complete search history.

(56) References Cited

U.S. PATENT DOCUMENTS 6,879,597 B2 * 4/2005 Tordera ................. H04W 88/02 370/463
7,597,250 B2 * 10/2009 Finn ........................ B60R 25/25 235/375
9,608,727 B2 * 3/2017 Aoyama ............ H04B 10/1149
2007/0228154 A1 * 10/2007 Tran ..................... G06K 7/0008 235/380

* cited by examiner

*Primary Examiner* — K. Wong
(74) *Attorney, Agent, or Firm* — Daniel M. Cohn; Howard M. Cohn

(57) ABSTRACT

Disclosed embodiments utilize a dual-frequency credential reader along with a dual-frequency access card that outputs two unique facility codes. A first facility code is associated with the legacy, low frequency credential transmission. A second facility code is associated with the secure, high frequency credential transmission. During the transition period, the new access readers are configured to read both low frequency, and high frequency credential data. The new access cards send out a first facility code at the first frequency, and a second facility code at the second frequency. In embodiments, the first facility code and second facility code of the new access cards are different than the facility code of the legacy cards. This allows users with new cards to use doorways at access points that still have legacy credential readers, simplifying the transition from a legacy access control system to a modern, secure access control system.

19 Claims, 8 Drawing Sheets

800

```
if filter_enable:
   (
      if option 1: equal:                 if (bit_length)  && (  (wiegand_buffer  & mask) == (value)  )
      if option 2: greater or equal:      if (bit_length)  && (  (wiegand_buffer  & mask) >= (value)  )
      if option 3: less than or equal:    if (bit_length)  && (  (wiegand_buffer  & mask) <= (value)  )
   )
      filter_facility_code()
```

830

834

FIG. 8

ELECTRONIC CREDENTIAL READER WITH FACILITY CODE FILTERING

FIELD OF THE INVENTION

The present invention relates generally to access control for building entrances, and more particularly, to an electronic credential reader.

BACKGROUND

Many facilities throughout the world utilize electronic access control. Examples of such facilities include hospitals, universities, businesses, factories, military installations, hotels, and residential units. There are thus, many thousands of access control components such as credential readers and access cards in existence today. Many of these readers and access cards (credentials) are of a legacy technology that is lacking advanced security features. With a legacy access control architecture, there is a credential reader mounted at an access point or door. When a user presents a credential to the reader and the credential is read, the credential reader sends the credential data to an access controller mounted somewhere on the premises behind the secure side of the door. The access controller then compares the data received from the electronic credential reader with a database of valid access credentials. If the credential is determined to have valid access privileges the controller energizes a relay that momentarily enables the unlocking mechanism of the door.

With such legacy systems, often, the communication between the credential and reader contains no security measures at all. This makes the credential data transmitted by the credential reader a point of vulnerability for the system, prone to interception by malicious actors. As there are many electronic credential readers in use today at various commercial, industrial, military, and other institutions, it is therefore desirable to have improvements in electronic access control.

SUMMARY

In one embodiment, there is provided an electronic credential reader, comprising: a processor; a memory coupled to the processor; a first credential receiver coupled to the processor; a second credential receiver coupled to the processor; wherein the memory contains instructions, that when executed by the processor, perform the steps of: receiving information via the first credential receiver and second credential receiver from a dual-frequency access card, wherein the information includes a first data value corresponding to a first frequency, and a second data value corresponding to a second frequency; obtaining a filter configuration, wherein the filter configuration includes the first data value; and filtering the first data value and sending data associated with the second data value to an access controller, wherein the access controller is configured and disposed to operate an electronically activated lock.

In another embodiment, there is provided a computer-implemented method for conditional access, comprising: receiving information from a dual-frequency access card, wherein the information includes a first data value corresponding to a first frequency, and a second data value corresponding to a second frequency; obtaining a filter configuration, wherein the filter configuration includes the first facility code; and filtering the first data value and sending data associated with the second data value to an access controller, wherein the access controller is configured and disposed to operate an electronically activated lock.

BRIEF DESCRIPTION OF THE DRAWINGS

The structure, operation, and advantages of the present invention will become further apparent upon consideration of the following description taken in conjunction with the accompanying figures (FIGS.). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity. Furthermore, for clarity, some reference numbers may be omitted in certain drawings.

FIG. 8 shows example conditional logic statements for filtering in accordance with embodiments of the present invention.

DETAILED DESCRIPTION

Figure 1:
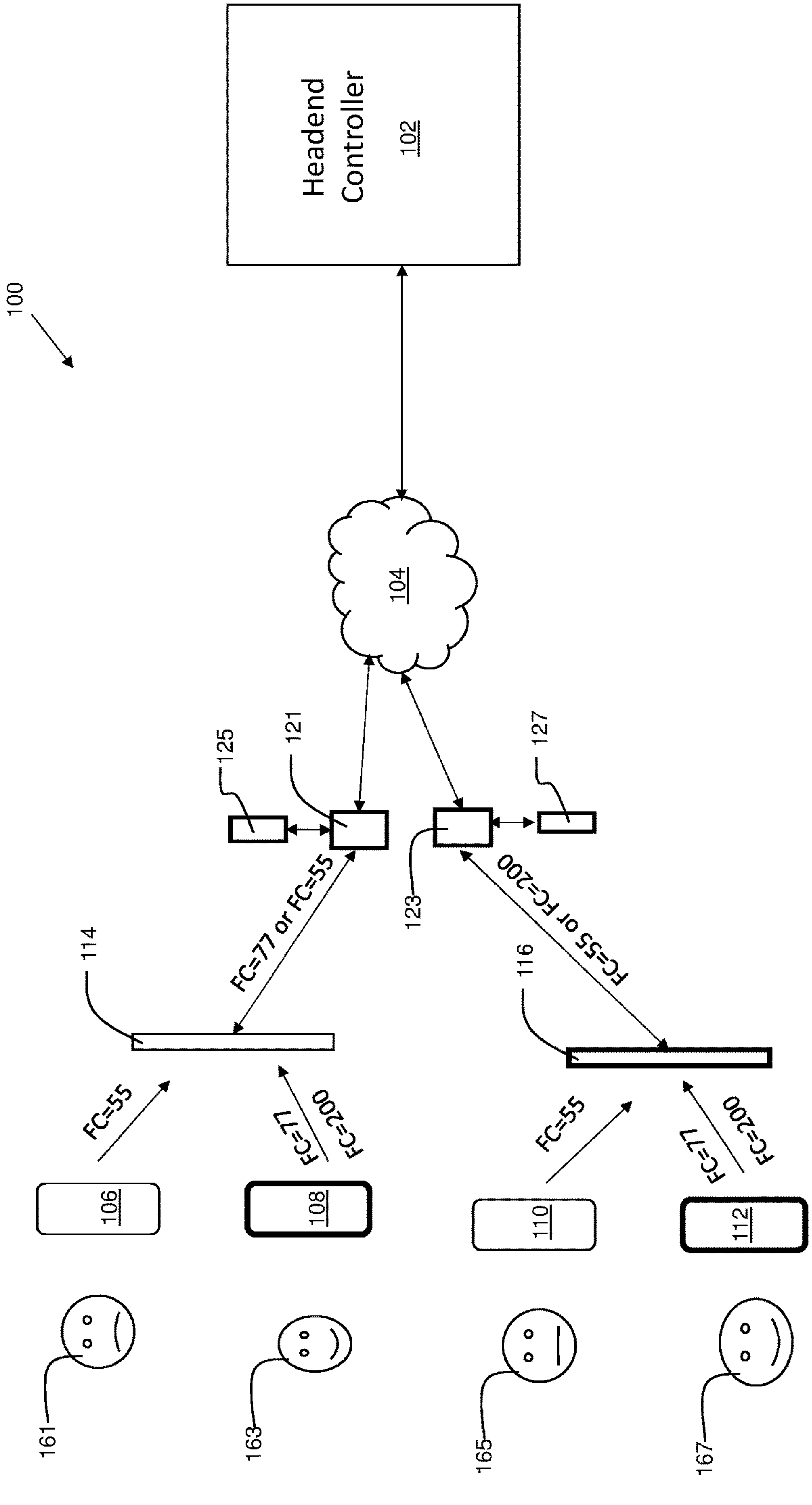
FIG. 1 is a diagram of a system in accordance with embodiments of the present invention in a transitional state.

Disclosed embodiments provide an electronic credential reader specifically designed for transitioning a facility from a legacy credential access control system to a secure credential access control system. A facility code filter is pre-programmed into the electronic credential readers prior to installation in a facility. Concurrently, dual-frequency access cards are provided to the users of the facility. The credential readers are replaced within the facility over a period of time. Legacy readers typically operate at 125 kilohertz with unencrypted data exchange, making them prone to spoofing and other attacks. Secure credential readers operate at a higher frequency and utilize encryption to exchange data between the access controller that operates the lock of an access point. The lock may be an electromechanical lock, magnetic lock, or other suitable lock type.

During the transition period, there exists a combination of legacy and secure credential readers, as the legacy credential readers are gradually replaced with secure credential readers. In some facilities there can be thousands of credential readers, making it extremely difficult to replace all credential readers at one time. Thus, for continuity of facility operation, it is desirable to be able to replace the credential readers and access cards over time, to minimize the disruption to the facility and the authorized users of the facility.

Disclosed embodiments utilize a dual-frequency credential reader along with a dual-frequency access card that outputs two unique data values, such as facility codes. A first facility code is associated with the legacy, low radio frequency credential transmission. A second facility code is associated with the secure, high radio frequency credential transmission. During the transition period, the new access readers are configured to read both low frequency, and high frequency credential data. This allows users who have not yet had the opportunity to replace their access cards to continue using the old, legacy access card that operates at the first frequency (e.g. 125 kHz). The new access cards send out a first facility code at the first (legacy) frequency, and a second facility code at the second (high) frequency. In embodiments, the first facility code and second facility code of the new access cards are different than the facility code of the legacy cards. Legacy card readers typically ignore facility code, and pass any credential data to the access controller. This principle allows users with new cards to use doorways at access points that still have legacy credential readers. Thus, even if it takes a few weeks to replace every user's access card, and all the legacy credential readers, the authorized users can still access their authorized locations using a combination of legacy and secure access control equipment.

While the aforementioned technique enables the convenience of replacing access control equipment over an extended length of time, it creates a new problem with respect to the new dual-frequency access cards when used with the new credential readers. Since the new credential readers listen on both the legacy frequency (e.g. 125 kHz) and the high frequency (e.g. 13.56 MHz or 2.4 GHz), the electronic credential reader could possibly send two different sets of credential data to the access controller nearly simultaneously as the user presents his/her card to the reader. This can cause unpredictable results such as the electronic lock failing to open when it should, or opening when it should not. Electronic credential readers of disclosed embodiments prevent this problem by preinstalling an electronic filter to filter out the legacy facility code of the new (dual facility code) cards, while allowing the secure facility code of the new (dual facility code) cards to be sent to the access controller. The legacy facility code of the new (dual facility code) cards is purposely selected to be different from the facility code in the old legacy cards, such that the legacy cards work in both old and new electronic credential readers, and the new cards work in both the old and new credential readers, and the new cards only send one set of credential data to the access controller when presented to a new credential reader. In this way, disclosed embodiments greatly simplify the daunting task of upgrading the access control system of a large facility. Further details of disclosed embodiments are described with reference to the figures.

FIG. 1 is a diagram of a system 100 in accordance with embodiments of the present invention in a transitional state. As shown, system 100 includes a legacy electronic credential reader 114 at one entrance, and a new, secure credential reader 116 at a second entrance. In embodiments, the legacy electronic credential reader 114 reads credentials modulated at a frequency of 125 kHz, and ignores the facility code within the credential data. Secure credential reader 116 reads credentials on both the legacy frequency (e.g. 125 kHz), and the secure frequency (high frequency) which may be 13.56 MHz, 2.4 GHz, or other suitable frequency or frequency range.

Credential reader 114 is coupled to access controller 121, which is coupled to electronically activated lock 125. Credential reader 116 is coupled to access controller 123, which is coupled to electronically activated lock 127. Each access controller may be connected to network 104, to enable communication with a headend controller 102. The headend controller 102 may be a computer system used to perform administrative functions such as adding and removing of users, editing the permissions of existing users, and/or collecting data and generating reports regarding user access of a given facility.

In the example, there are currently four access cards in use by individual users. User 161 has a legacy access card 106. User 163 has a secure (dual facility code) access card 108. User 165 has a legacy access card 110. User 167 has a secure (dual facility code) access card 112. In the example, the legacy access cards (106 and 110) use a facility code of 55. The new (dual facility code) access cards utilize two frequencies. On a first frequency compatible with the legacy electronic credential readers (e.g. 114), a first facility code of 77 is used. This facility code is intentionally selected to be different from the legacy access card facility code of 55. On a second frequency compatible with the new, secure electronic credential readers (e.g. 116,), a second facility code is used (e.g. 200).

When user 161 presents his access card 106 at the legacy electronic credential reader 114, the credential data is sent to the access controller 121 for granting access (assuming other credential data sent by card 106 agrees with data in the access controller 121). The legacy electronic credential reader 114 sends received data to the access controller 121 regardless of the facility code value.

When user 163 presents his access card 108 at the legacy electronic credential reader 114, the legacy credential data with facility code 77 (denoted by "FC=77" in FIG. 1) is sent to the access controller 121 for granting access (assuming other credential data sent by card 108 agrees with data in the access controller 121). The legacy electronic credential reader 114 does not contain the receiver for reading the high frequency (e.g. 13.56 MHz and/or 2.4 GHz) frequencies, and thus, inherently filters the secure facility code of 200, preventing it from reaching the access controller 121.

When user 165 presents his access card 110 at the new, secure, dual-frequency electronic credential reader 116, the legacy credential data is sent to the access controller 123 for granting access (assuming other credential data sent by card 110 agrees with data in the access controller 123). Since the legacy access cards only transmit one facility code at the low frequency (e.g. 125 kHz) and do not transmit any other facility codes, the access controller 123 only receives one facility code.

When user 167 presents his access card 112 at the new, secure, dual-frequency electronic credential reader 116, both the legacy credential data (with facility code 77) and the new, secure credential data (with facility code 200) is detected by the electronic credential reader 116. This potentially could create a problem if both sets of credential data originating from the same access card 112 were to reach the access controller 123. The problems could include unexpected behavior of electronically activated lock 127, such as unlocking when it should not unlock, or remaining locked when it should be unlocked. To address this problem, disclosed embodiments perform facility code filtering, and filter out credential data with the facility code associated with the legacy frequency on the new dual-frequency cards. In the example of FIG. 1, this means that the legacy facility code value of 77 is not sent to the access controller 123. In this way, the access controller 123 only receives the facility code 200 when user 167 presents his access card 112 to the electronic credential reader 116. Thus, in all possible combinations (legacy card with legacy reader, legacy card with new reader, new card with legacy reader, new card with new reader), the access controller only receives one set of electronic credential information for a presentation of an access card. In this way, the problem of multiple sets of credential information causing access controller malfunctions during transition periods of changeover for access control is solved by embodiments of the present invention.

Figure 2:
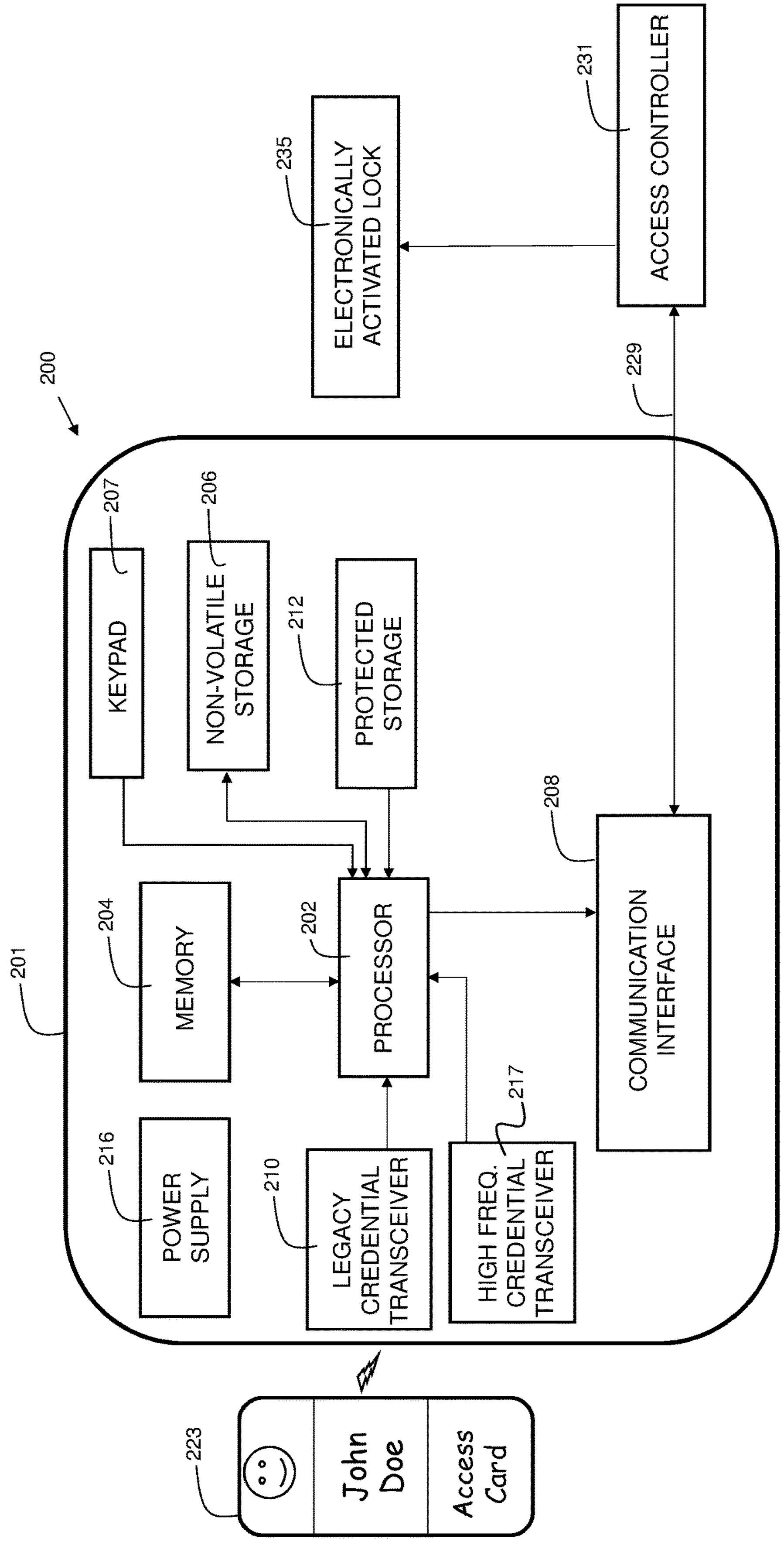
FIG. 2 is a block diagram of a credential reader in accordance with embodiments of the present invention.

FIG. 2 is a block diagram 200 of a credential reader 201 in accordance with embodiments of the present invention. Electronic credential reader 201 comprises a processor 202. Memory 204 is coupled to processor 202. Memory 204 may be a non-transitory computer readable medium. Memory 204 can include, but is not limited to, flash memory, read-only memory (ROM), optical storage, magnetic storage, or other suitable storage technology. A non-volatile storage 206 is coupled to the processor 202. The non-volatile storage 206 can include battery-backed SRAM (static random-access memory), flash, magnetic storage, or other suitable storage technology. Power supply 216 provides power to the processor 202, storage elements such as memory 204, non-volatile storage 206, and protected storage 212, as well as other peripherals within the electronic credential reader 201. The power supply 216 may receive an alternating current (AC) source as an input and output a variety of positive and negative direct current (DC) voltages.

In some embodiments, the electronic credential reader 201 may also be equipped with a keypad 207. The keypad 207 may include a numeric keyboard, an alphanumeric keyboard, or other combination of buttons, and keys including numbers, letters, and/or symbols.

Electronic credential reader 201 includes a legacy credential transceiver 210. In embodiments, legacy credential receiver 210 is a radio receiver configured and disposed to receive credential data modulated at a frequency of 125 kHz. Electronic credential reader 201 also includes a high-frequency credential transceiver 217. In embodiments, high-frequency credential receiver 217 is a radio receiver configured and disposed to receive credential data modulated at a frequency of 13.56 MHz and/or frequencies in the 2.4 GHz range. Some embodiments may include three credential transceivers. In embodiments, the electronic credential reader may include a legacy credential transceiver operating at 125 kHz, a first high-frequency credential receiver configured and disposed to receive credential data modulated at a frequency of 13.56 MHz, and a second high-frequency credential receiver configured and disposed to receive credential data modulated at a frequency in the 2.4 GHz range.

The credential may be in the form of a card, shown as reference 223 in FIG. 1. The card 223 can be a legacy card supporting a single frequency and single facility code. Alternatively, the card 223 can be a dual-frequency card supporting simultaneous sending of two sets of credential data on two different frequencies. In some embodiments, the credential may be a fob, wristband, smart phone, or other suitable technology for implementing a credential.

Regardless of the type of credential, the electronic credential reader 201 transmits a credential received by the credential receiver to an access controller 231. The access controller 231 checks the received credential against a database or list of credentials and associated permissions. If the credential and permissions indicate entry is allowable, the access controller 231 temporarily unlocks electronically activated lock 235, allowing a user with the credential to pass through an entrance that is secured by the electronically activated lock 235. In embodiments, the electronically activated lock 235 may include an electronic strike, solenoid-based lock, magnetic lock, and/or other suitable lock type.

The communication between the electronic credential reader 201 and access controller 231 may utilize a communication protocol such as Open Supervised Device Protocol (OSDP). OSDP utilizes communication interface 208. In embodiments, communication interface 208 is an RS-485 interface. The RS-485 interface enables bidirectional communication. In this way, utilizing the communication interface 208 and the electronic credential reader 201 can support advanced security features such as methods of implementing encryption, key management, and authentication on an OSDP connection. OSDP can support security features such as AES-128 encryption and Cipher-based Message Authentication Code (CMAC) chaining to improve overall security of the access control system for premises.

Electronic credential reader 201 may further include protected storage 212. This may include a region of read-only memory that includes a unique identifier (UID) such as a MAC address, serial number, or other suitable identifier, as well as security certificates. This can enable secure communication between the access controller 231 and the electronic credential reader 201, including encrypted and/or digitally signed messages exchanged between the electronic credential reader 201 and the access controller 231 via external communication link 229.

Embodiments provide a processor; a memory coupled to the processor; a first credential receiver coupled to the processor; a second credential receiver coupled to the processor; wherein the memory contains instructions, that when executed by the processor, perform the steps of: receiving information via the first credential receiver and second credential receiver from a dual-frequency access card, wherein the dual-frequency access card includes a first facility code corresponding to a first frequency, and a second facility code corresponding to a second frequency; obtaining a filter configuration, wherein the filter configuration includes the first facility code; and in response to detecting the dual-frequency access card, filtering the first facility code and sending data associated with the second facility code to an access controller, wherein the access controller is configured and disposed to operate an electromechanical lock.

In embodiments, the first credential receiver (legacy credential receiver) is configured to receive a signal modulated at a frequency of 125 kilohertz. In embodiments, the second credential receiver (high frequency credential receiver) is configured to receive a signal modulated at a frequency of 13.56 megahertz. This frequency is well suited for smart card applications utilizing Wiegand bit streams and user ID's stored securely in memory. The ID in the memory is secured through a combination of mutual authentication, data encryption and cypher block chaining.). In embodiments, the second credential receiver (high frequency credential receiver) is configured to receive a signal modulated at a frequency of 2.4 gigahertz. This frequency is well suited for use with Bluetooth Low Energy (BLE) equipment.

Figure 3:
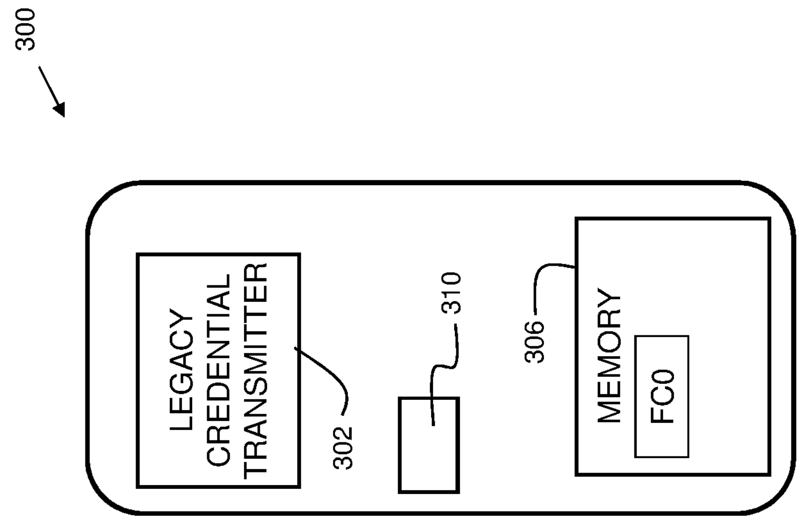
FIG. 3 is a block diagram of a legacy access card.

FIG. 3 is a block diagram of a legacy access card 300. Legacy access card 300 includes a processor 310, a legacy credential transmitter 302 coupled to the processor 310, and a memory 306 coupled to the processor 310. The memory 306 contains a facility code FC0 which is transmitted to a credential reader via the legacy credential transmitter 302. In embodiments, the legacy credential transmitter 302 operates at a modulation frequency of 125 kHz.

Figure 4:
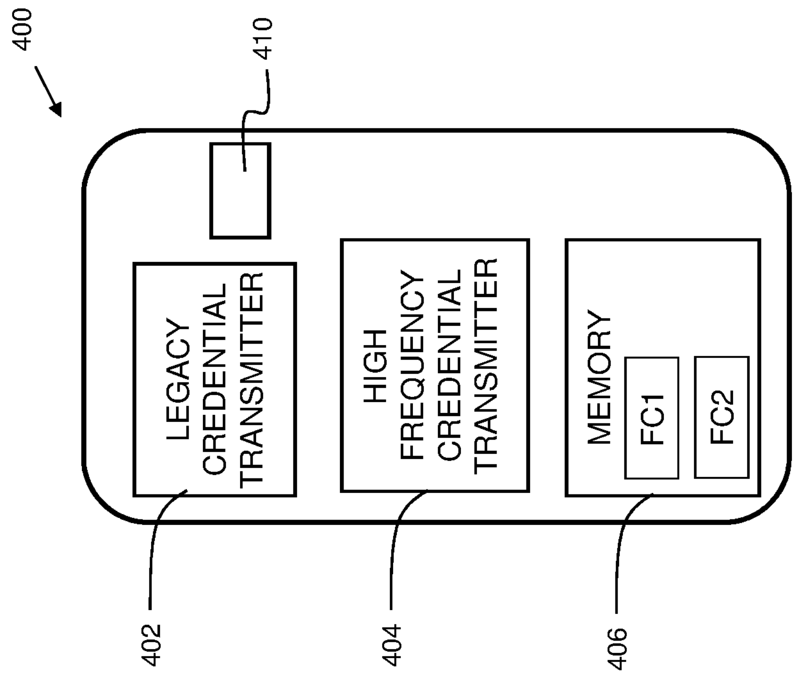
FIG. 4 is a block diagram of a dual-frequency access card in accordance with embodiments of the present invention.

FIG. 4 is a block diagram of a dual-frequency access card 400 in accordance with embodiments of the present invention. Dual-frequency access card 400 includes a processor 410, a legacy credential transmitter 402 coupled to the processor 410, and a memory 406 coupled to the processor 410. The dual-frequency card 400 further comprises a high frequency credential transmitter 404 coupled to the processor 410. The memory 406 contains a first facility code FC1 which is transmitted to a credential reader via the legacy credential transmitter 402. The memory 406 further contains a second facility code FC2 which is transmitted to a credential reader via the legacy credential transmitter 402. In embodiments, the legacy credential transmitter 402 operates at a modulation frequency of 125 kHz. In embodiments, the high frequency credential transmitter 404 operates at a modulation frequency of 13.56 MHz. In embodiments, the high frequency credential transmitter 404 operates at a modulation frequency range of 2.4 GHz. In embodiments, techniques such as frequency-hopping maybe used with the high frequency credential transmitter 404. In embodiments, the facility codes FC0, FC1, and FC2 are each distinct from each other. As an example, in embodiments, FC0=55, FC1=77, and FC2=200. With the credential reader of disclosed embodiments as shown in FIG. 2, it is possible for the user population of a facility to have a mix of legacy access cards (FIG. 3) and dual-frequency secure access cards (FIG. 4) without undue disruption, enabling a transition period that is essential for large facilities such as hospitals that are operated continuously, and may have thousands of users and credential readers requiring upgrade. Disclosed embodiments enable a transition period, allowing security to be upgraded over time or in phases, allowing for logistical and financial considerations in scheduling an access control system upgrade.

Figure 5:
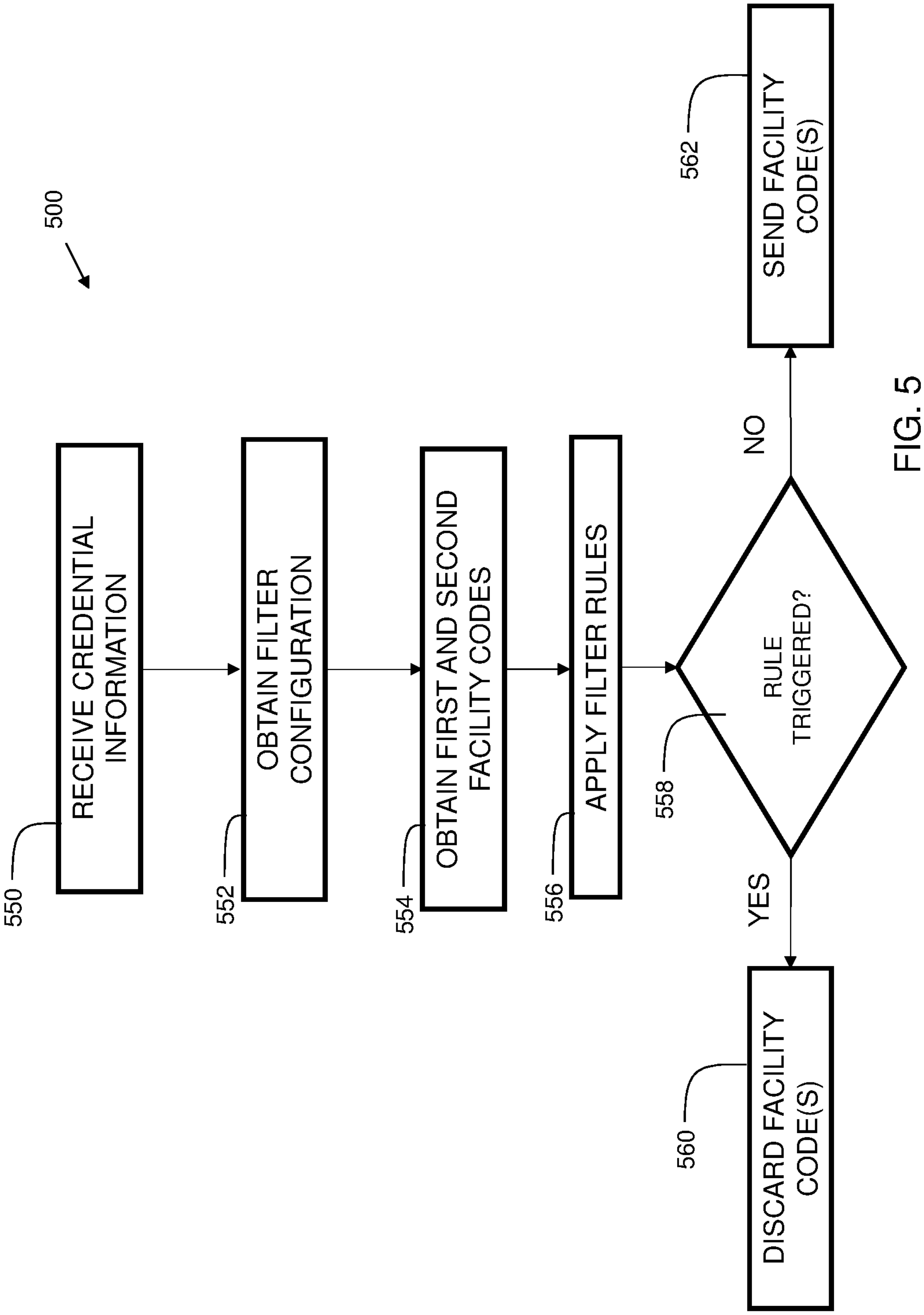
FIG. 5 is a flowchart showing process steps for embodiments of the present invention.

FIG. 5 is a flowchart 500 showing process steps for embodiments of the present invention. In process step 550, credential information is received. The credential information can include multiple sets of credential data, such as transmitted from two transmitters of a dual-frequency access card. In process step 552 a filter configuration is obtained. In embodiments, this configuration may be set as part of a pre-installation process. The filter configuration establishes filter rules that determine which facility code(s) are to be filtered (discarded). In process step 554, a first facility code and a second facility code are received from a dual-frequency access card. In process step 556 filter rules are applied to the received filter code(s) to determine if the facility code(s) are to be filtered (discarded), or sent to the access controller (e.g. 231 of FIG. 2). If, at process step 558, the rule is triggered, then the corresponding facility code(s) are discarded in process step 560, and thus, are not sent upstream to the access controller. If instead, at process step 558, the filter rule is not triggered, then the process continues to process step 562, where the facility codes are sent to the access controller.

A variety of filter rules may be used in embodiments of the present invention. Embodiments include filtering of the first facility code in response to detecting the first facility code as being equal to a predetermined value. Embodiments include filtering of the first facility code in response to detecting the first facility code as being unequal to a predetermined value. Embodiments include filtering of the first facility code in response to detecting the first facility code as being greater than a predetermined value. Embodiments include filtering of the first facility code in response to detecting the first facility code as being less than a predetermined value. Embodiments include filtering of the first facility code in response to detecting the first facility code as being greater than or equal to a predetermined value. Embodiments include filtering of the first facility code in response to detecting the first facility code as being less than or equal to a predetermined value. In some embodiments, multiple filter rules may be logically combined. For example, two equality rules may be logically combined. As an example, if it is desired to filter out both facility code 55 and facility code 77, then a logical OR of a rule to filter out a facility code of 55 or 77 can be used to filter out both facility codes. Additional filter rules are possible in some embodiments.

Figure 6:
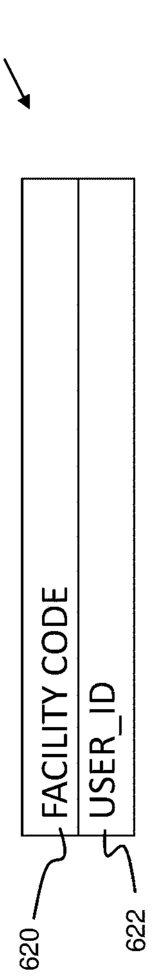
FIG. 6 shows example credential data sent from an access card.

FIG. 6 shows example credential data 600 sent from an access card. Credential data 600 includes a facility code 620, and a user identifier 622. In embodiments, additional fields may also be present. In embodiments, the facility code may be a 32-bit value, 35-bit value, or other suitable data size. Similarly, the user_id field, which is a unique value assigned to each authorized user of a facility may be a 32-bit value, 35-bit value, or other suitable data size. In embodiments, the credential reader checks the facility code 620 before sending the user identifier 622 to the access controller.

Figure 7:
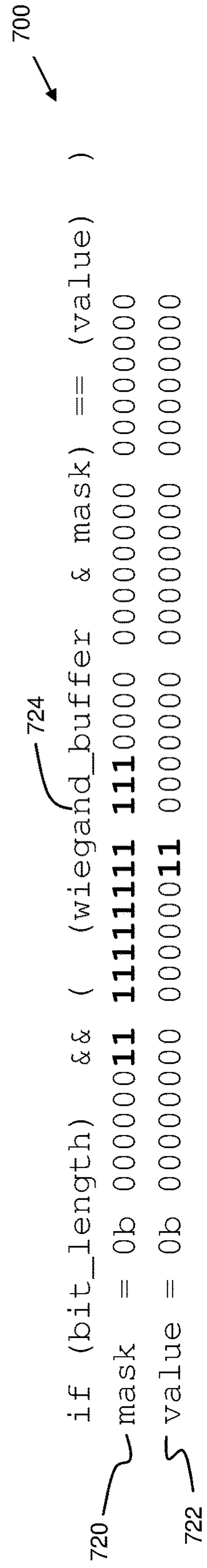
FIG. 7 shows a filter rule for filtering in accordance with embodiments of the present invention.

FIG. 7 shows a filter rule 700 for filtering in accordance with embodiments of the present invention. In the example, the filter rule checks a bit_length variable to determine if the proper number of bits have been received from a serial bitstream from the access card. If the proper number of bits have been received, then a mask value 720 is used in a logical AND operation with the received buffer data 724 (represented by the wiegand_buffer variable). If the resulting logical AND operation matches the value 722, then the filter rule is deemed to match, and the corresponding data is discarded. This is merely an example of a filter rule. Other filter rules can include filtering data that does not match, or filtering various ranges of data.

FIG. 8 shows example conditional logic statements for filtering in accordance with embodiments of the present invention. The conditional logic statements 800 represent some other possible filter rules as options 830. In embodiments, the pseudo-code shown can include the three options shown at 830. Option one shows a filter rule for filtering based on equality. Option two shows a filter rule of filtering based on greater than or equal to a value. Option three shows a filter rule of filtering based on less than or equal to a value. If the filter rule is satisfied, the filter_facility_code( ) function 834 is executed to cause the data from the received buffer data from the access card to be discarded, thereby preventing unexpected operation or malfunction of the access controller when dual-frequency access cards are used in simultaneous transmission mode.

Figure 9:
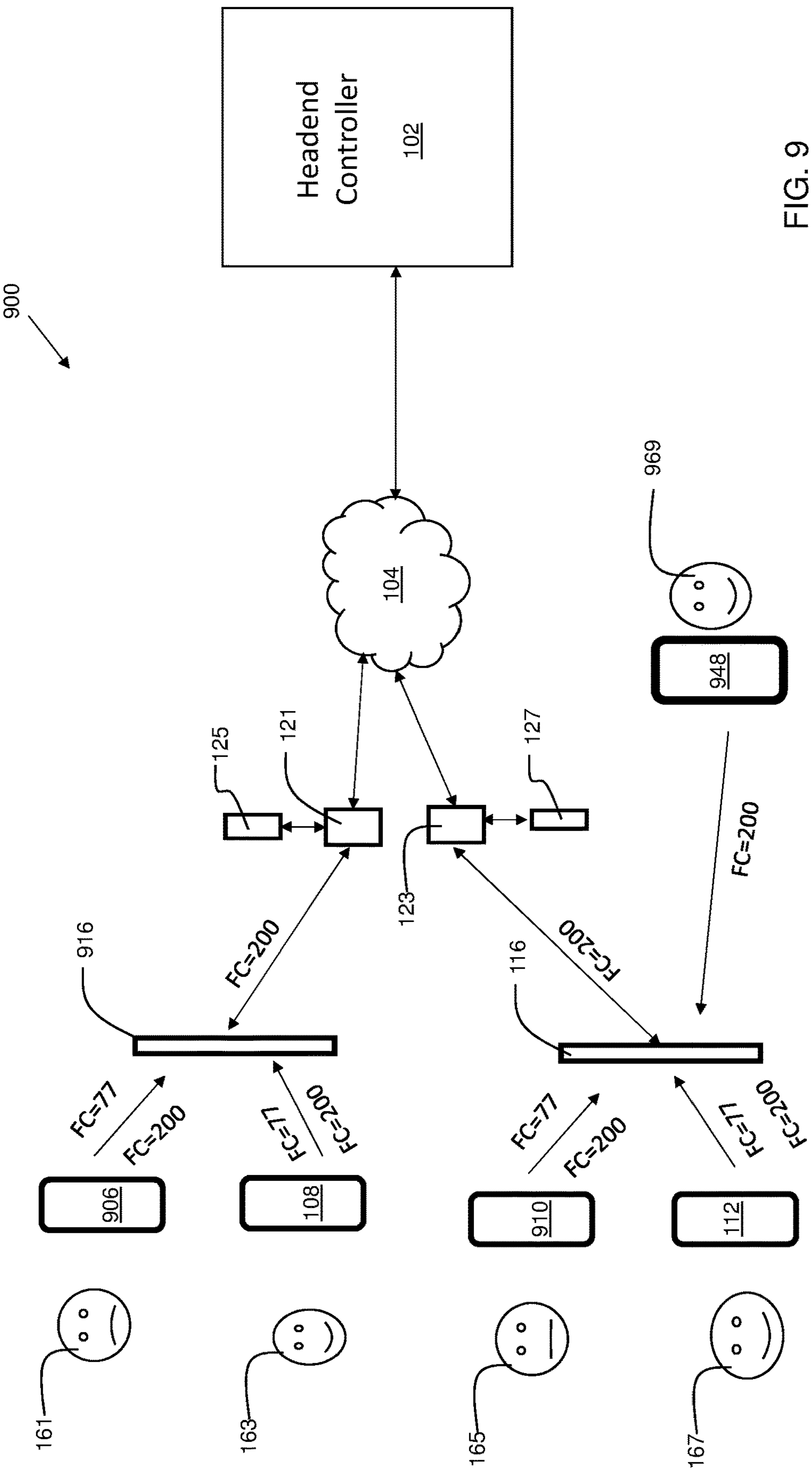
FIG. 9 is a diagram of a system in accordance with embodiments of the present invention in a secure state.

FIG. 9 is a diagram of a system 900 in accordance with embodiments of the present invention in a secure state. System 900 may be compared with system 100 of FIG. 1 for reference in illustrating operation in secure mode. In secure mode, the legacy electronic credential reader 114 is replaced with secure credential reader 916 (similar in function to secure credential reader 116). Similarly, user 161 obtains upgraded dual-frequency access card 906, and user 165 obtains upgraded dual-frequency access card 910. Thus, at this time, users 161, 163, 165, and 167 each have a dual-frequency access card. The dual-frequency access cards transmit credential data including both the legacy credential data (with facility code 77) and the new, secure credential data (with facility code 200), that is detected by the dual-frequency electronic credential readers (116 and 916). The dual-frequency electronic credential readers filter out the first facility code 77, such that only the facility code associated with the high frequency transmitter of the access cards reaches the access controllers (121 and 123). While aforementioned examples showed filtering out (discarding) a specific facility code, embodiments support filter rules that allow discarding a range of facility codes. As an example, a filter rule using "less than" can cause the electronic credential readers of disclosed embodiments to discard any facility code that has a value less than 55 (or other predetermined value).

Once the facility is in secure mode (where all legacy credential readers have been replaced by dual-frequency credential readers such as shown in FIG. 2), new users can be issued single frequency cards that operate at the high frequency. As an example, new user 969 is issued single high frequency access card 948, which transmits only the second facility code (e.g. FC=200). Since the facility no longer includes any legacy credential readers, considerable cost savings can be achieved by issuing single frequency access cards that operate at the frequency used for secure operation (e.g. 13.56 MHz and/or 2.4 GHz range). In this way, once the transition period is complete, and the facility is in secure mode, the costs of issuing new credentials is reduced. In some embodiments, the headend controller 102 can send a transceiver disable command via network 104 to an access controller, which in turn relays the transceiver disable command to the credential reader 116. This can be done once there are no longer any legacy access cards in the user population. Once this condition is met, then, upon receiving the transceiver disable command, the credential reader can disable the legacy credential receiver (210 of FIG. 2), adding an extra measure of security as well as saving power. Thus, embodiments include disabling the legacy credential receiver in response to receiving a transceiver disable command from the headend controller. In some embodiments, the headend controller automatically sends the transceiver disable command once it detects that updated dual-frequency access cards have been assigned to all authorized users.

As can now be appreciated, the electronic credential readers of disclosed embodiments solve the problem of multiple sets of credential data reaching the access controller from dual-frequency access cards by preinstalling an electronic filter to filter out the legacy facility code of the new (dual facility code) cards, while allowing the secure facility code of the new (dual facility code) cards to be sent to the access controller. The legacy facility code of the new (dual facility code) cards is purposely selected to be different from the facility code in the old legacy cards, such that the legacy cards work in both old and new electronic credential readers, and the new cards work in both the old and new credential readers, and the new credential readers only send one set of credential data to the access controller when a dual-frequency access card is presented to them. In this way, disclosed embodiments greatly simplify the daunting task of upgrading the access control system of a large facility. While various embodiments utilize facility codes to accomplish this, some embodiments may instead use other data, such as a portion of a Wiegand buffer, such as the ID portion of the Wiegand buffer.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. An electronic credential reader, comprising:
a processor;
a memory coupled to the processor;
a first credential receiver coupled to the processor;
a second credential receiver coupled to the processor;
wherein the memory contains instructions, that when executed by the processor, cause the electronic credential reader to:
receive information via the first credential receiver and second credential receiver from a dual-frequency access card, wherein the information includes a first data value, comprising a first facility code corresponding to a first frequency, wherein the first frequency is a legacy frequency, and a second data value, comprising a second facility code corresponding to a second frequency, wherein the second frequency is higher than the first frequency;
obtain a filter configuration, wherein the filter configuration includes the first facility code; and
filter the first facility code and sending data associated with the second facility code to an access controller, wherein the access controller is configured and disposed to operate an electronically activated lock.

2. The electronic credential reader of claim 1, wherein the second credential receiver is configured to receive a signal modulated at a frequency of 13.56 megahertz.

3. The electronic credential reader of claim 1, wherein the second credential receiver is configured to receive a signal modulated at a frequency of 2.4 gigahertz.

4. The electronic credential reader of claim 1, wherein the memory further contains instructions, that when executed by the processor, perform filtering of the first facility code in response to detecting the first facility code as being equal to a predetermined value.

5. The electronic credential reader of claim 1, wherein the memory further contains instructions, that when executed by the processor, perform filtering of the first facility code in response to detecting the first facility code as being unequal to a predetermined value.

6. The electronic credential reader of claim 1, wherein the memory further contains instructions, that when executed by the processor, perform filtering of the first facility code in response to detecting the first facility code as being greater than a predetermined value.

7. The electronic credential reader of claim 1, wherein the memory further contains instructions, that when executed by the processor, perform filtering of the first facility code in response to detecting the first facility code as being less than a predetermined value.

8. The electronic credential reader of claim 1, wherein the memory further contains instructions, that when executed by the processor, perform filtering of the first facility code in response to detecting the first facility code as being greater than or equal to a predetermined value.

9. The electronic credential reader of claim 1, wherein the memory further contains instructions, that when executed by the processor, perform filtering of the first facility code in response to detecting the first facility code as being less than or equal to a predetermined value.

10. A computer-implemented method for conditional access, comprising:

receiving information from a dual-frequency access card, wherein the information includes a first data value, comprising a first facility code corresponding to a first frequency wherein the first frequency is a legacy frequency, and a second data value, comprising a second facility code corresponding to a second frequency, wherein the second frequency is higher than the first frequency;

obtaining a filter configuration, wherein the filter configuration includes the first facility code; and filtering the first facility code and sending data associated with the second facility code to an access controller, wherein the access controller is configured and disposed to operate an electronically activated lock.

11. The method of claim 10, wherein the second frequency is 13.56 megahertz.

12. The method of claim 10, wherein the second frequency is 2.4 gigahertz.

13. The method of claim 10, wherein obtaining a filter configuration comprises obtaining a filter configuration to filter the first facility code in response to detecting the first facility code as being equal to a predetermined value.

14. The method of claim 10, wherein obtaining a filter configuration comprises obtaining a filter configuration to filter the first facility code in response to detecting the first facility code as being unequal to a predetermined value.

15. The method of claim 10, wherein obtaining a filter configuration comprises obtaining a filter configuration to filter the first facility code in response to detecting the first facility code as being greater than a predetermined value.

16. The method of claim 10, wherein obtaining a filter configuration comprises obtaining a filter configuration to filter the first facility code in response to detecting the first facility code as being less than a predetermined value.

17. The method of claim 10, wherein obtaining a filter configuration comprises obtaining a filter configuration to filter the first facility code in response to detecting the first facility code as being greater than or equal to a predetermined value.

18. The method of claim 10, wherein obtaining a filter configuration comprises obtaining a filter configuration to filter the first facility code in response to detecting the first facility code as being less than or equal to a predetermined value.

19. The method of claim 10, wherein filtering the first facility code comprises establishing a filter rule, wherein the filter rule comprises a bit length variable, and wherein the bit length variable is used with a logical AND operation to determine that a proper number of bits are received from a serial bitstream from the dual-frequency access card.

* * * * *